Mar. 20, 1923.

J. SOLTYS.
FURNACE RUNNER GATE OPERATING MECHANISM.
FILED SEPT. 2, 1921.

1,448,948.

Inventor
John Soltys,
By
Attorneys

Patented Mar. 20, 1923.

1,448,948

UNITED STATES PATENT OFFICE.

JOHN SOLTYS, OF DETROIT, MICHIGAN.

FURNACE RUNNER-GATE-OPERATING MECHANISM.

Application filed September 2, 1921. Serial No. 498,079.

*To all whom it may concern:*

Be it known that I, JOHN SOLTYS, a citizen of Poland, residing at Detroit, in the county of Wayne and State of Michigan, have invented certain new and useful Improvements in Furnace Runner-Gate-Operating Mechanism, of which the following is a specification, reference being had therein to the accompanying drawings.

This invention relates to means for operating gates controlling the flow of molten masses through the runners or troughs leading from blast furnaces and the like and its object is to eliminate the danger to life and limb in the normal operation of such gates and further to provide means whereby any one of the several gates of a runner may be operated at a distance and from behind a shield arranged to protect the operator. A further object is to provide means for simultaneously operating the gates of a pair and guiding such gates in their opening and closing movements, such guiding means being so arranged that it may be quickly and conveniently removed to give the workmen free access to their work in cleaning out the runners or troughs. It is also an object of the invention to provide certain other new and useful features in the construction and arrangement of mechanism.

With the above and other ends in view, the invention consists in the matters hereinafter set forth and more particularly pointed out in the appended claims, reference being had to the accompanying drawing, in which—

Figure 1:
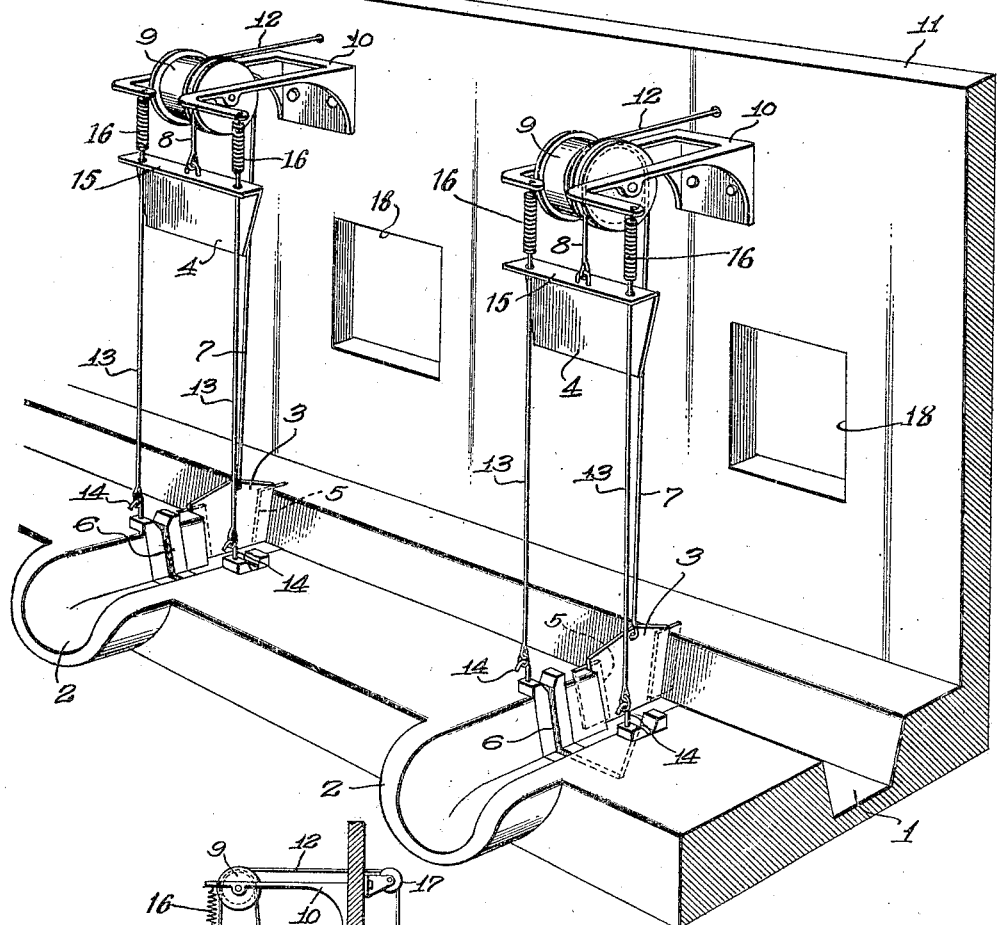
Figure 2:
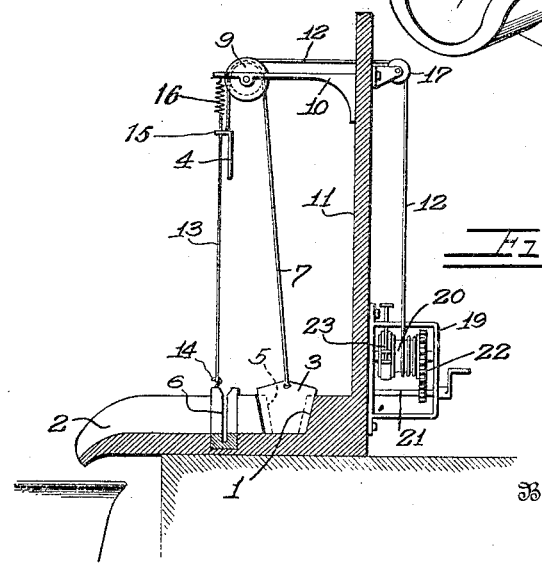

Figure 1 is a perspective view of a runner with mechanism illustrative of the invention in operative position relative thereto; and Fig. 2 is a transverse vertical section through the same.

In the operation of blast furnaces and the like, the slag or molten material is run off from the furnace through runners or troughs, each of which has branch runners or lateral spouts through which the molten metal is discharged into suitable ladles or other means for carrying it away. Gates are provided for each lateral runner, one to block the flow down the main runner and deflect it into the lateral, and the other to close the lateral and permit the mass to flow on down the main runner to the next lateral. These gates have usually been operated manually, exposing the workmen to the intense heat of the molten material and to the dangers of working in proximity thereto.

The present invention relates to mechanical means for operating the gates of each pair simultaneously, and to detachable guiding means for certain of the gates, which guiding means may be quickly removed so that there will be nothing to hinder the workmen in cleaning the slag or residue from the runners after each discharge from the furnace, the main runner or trough being indicated in the drawings at 1, and the laterals or spouts by the numeral 2. The gates 3 for the main runner are each positioned adjacent the lower or down stream side of a lateral 2 and the gates 4 close the inlets from the main runner into the laterals, said gates all being lifting gates adapted to seat in guides or seats 5 and 6 provided therefor in the side and bottom walls of the troughs or runners 1 and 2 respectively. To lift the gates 3, cables 7 are attached thereto and similar lifting cables 8 are secured to the gates 4 intermediate their ends. These cables are wound upon drums 9 supported at a considerable height above the runners by brackets 10 secured to a wall 11 extending along the main runner 1 adjacent one side of the same. The gates are thus arranged in pairs, one pair for each lateral 2, and the cables for lifting the gates of each pair lead from opposite sides of their drum so that as one cable is payed off by the turning of the drum, the other will be wound thereon, thus lifting one gate and simultaneously lowering the other. Each drum 9 is turned in one direction by means of a cable 12 wound thereon with one end secured to the drum and as the gate 4 of each pair is much heavier than the gate 3, its weight will normally tend to turn the drum in one direction and raise the other gate, such turning movement winding the cable 12 upon the drum. Likewise a pull upon the cable 12 will turn the drum in an opposite direction, lifting the gate 4 and lowering the gate 3.

To guide each of the gates 4 in their vertical movements and into their seats 6 when lowered, a pair of cables, rods or similar guiding members 13 is provided for each gate 4, said guide members being detachably held at their lower ends by hooks 14 located at the sides of the lateral engaging loops or eyes on the lower ends of the members which members extend through guide openings in a flange 15 on the gate 4 and are made fast at their upper ends to the supporting bracket 10 by a resilient connection such as springs 16 so that these guide members will always be held taut and the springs will yield to permit the ready disengagement of the lower ends of the guides from their hooks 14. These guides may therefore be readily disconnected from their hooks and swung out of the way when the workmen are cleaning out the runners after each discharge of the furnace.

The cable 12 for rotating each drum 9 is extended over a pulley 17 on the wall 11 which forms a support for the brackets 10 and also a shield to protect the workman operating the gates, operating mechanism being mounted on the side of the wall away from the runners and openings 18 provided in this wall through which he may view the runners and operation of the gates without being exposed to the extreme heat of the molten material in the runners and the dangers incident to the operation of the gates.

The mechanism for operating the cables 12 comprises a frame 19 in which is mounted a winding drum 20 upon which the cable is wound, an operating shaft 21 having a crank on its outer end and gearing 22 for transmitting motion from the operating shaft to the drum.

Suitable brake mechanism indicated at 23, is also provided for controlling the drum so that the lowering of the gate 4 by gravity may be controlled and the drum held against turning.

By this arrangement, the gates may be mechanically operated without exposing the operator to the heat of the molten material flowing along the main runner and during the cleaning out of the runners the guide members may be detached and swung out of the way so that the device will be of no hindrance to the workmen.

Obviously changes may be made in the construction and arrangement of the parts to suit the varying conditions of installation and within the scope of the appended claims, without departing from the spirit of the invention, and I do not therefore limit myself to the particular construction shown.

Having thus fully described my invention what I claim is:—

1. The combination of a main runner for the passage of molten material from a furnace and lateral runners leading from said main runner, of pairs of gates adjacent each lateral runner, a protecting wall extending along the main runner at one side thereof, means mounted on said wall for simultaneously operating the gates of each pair, and means located at the side of the wall away from the runner for operating and controlling the operation of said means for operating the gates.

2. The combination of a main runner for the passage of molten material from a furnace and lateral runners leading from said main runner, of pairs of gates adjacent each lateral runner, cables attached to said gates of each pair for raising and lowering the same, a drum upon which the cables are wound to raise one gate of each pair and simultaneously lower the other gate, and means operative at a distance for turning said drums.

3. The combination of a main runner for the passage of molten material from a furnace and lateral runners leading from said main runner, of pairs of gates adjacent each lateral runner, cables attached to said gates of each pair for raising and lowering the same, and means for guiding one of said gates in its movements comprising a pair of guide members upon which the gate slides, means for detachably holding the lower ends of said guide members, and means for yieldingly supporting the upper ends of said guide members.

4. The combination of a main runner, for the passage of molten material from a furnace and lateral runners leading from said main runner, of pairs of gates adjacent each lateral runner, cables attached to said gates of each pair for raising and lowering the same, and means for guiding one of said gates in its movements comprising a pair of guide members upon which the gate slides, hooks for detachably holding the lower ends of said guide members, a support, and springs connecting the upper ends of said guide members and said support.

In testimony whereof I affix my signature in presence of two witnesses.

JOHN SOLTYS.

Witnesses:
 KARL H. BUTLER,
 G. E. McGRANN.